(12) United States Patent
Mohr et al.

(10) Patent No.: US 8,352,427 B2
(45) Date of Patent: Jan. 8, 2013

(54) SYSTEM INTEGRATION ARCHITECTURE

(75) Inventors: Christian Mohr, Wiesloch (DE); Sascha Zorn, Groetzingen (DE)

(73) Assignee: SAP AG, Walldorf (DE)

( * ) Notice: Subject to any disclaimer, the term of this patent is extended or adjusted under 35 U.S.C. 154(b) by 217 days.

(21) Appl. No.: 12/846,976

(22) Filed: Jul. 30, 2010

(65) Prior Publication Data
US 2012/0030166 A1 Feb. 2, 2012

(51) Int. Cl.
  *G06F 7/00* (2006.01)
  *G06F 17/00* (2006.01)
(52) U.S. Cl. ......... 707/634; 707/625; 707/635; 707/696
(58) Field of Classification Search .................. 707/625, 707/634, 635, 696
See application file for complete search history.

(56) References Cited

U.S. PATENT DOCUMENTS

| | | | |
|---|---|---|---|
| 6,910,070 B1* | 6/2005 | Mishra et al. | 709/224 |
| 2002/0116457 A1* | 8/2002 | Eshleman et al. | 709/203 |
| 2004/0193653 A1* | 9/2004 | Howard et al. | 707/200 |
| 2004/0267776 A1* | 12/2004 | Brown et al. | 707/100 |
| 2007/0073674 A1* | 3/2007 | McVeigh et al. | 707/4 |
| 2007/0239790 A1* | 10/2007 | Cattell et al. | 707/200 |
| 2009/0282125 A1* | 11/2009 | Jeide et al. | 709/217 |
| 2010/0174863 A1* | 7/2010 | Cooper et al. | 711/113 |
| 2011/0246425 A1* | 10/2011 | Munoz | 707/640 |
| 2012/0023077 A1* | 1/2012 | Kann et al. | 707/702 |

* cited by examiner

*Primary Examiner* — Shew-Fen Lin
(74) *Attorney, Agent, or Firm* — Brake Hughes Bellermann LLP (57) ABSTRACT

The inter-system communications techniques include a system, and/or a method. In some embodiments of these techniques, the method includes receiving data from a first system. The method further includes storing the received data in an in-memory database. The method further includes determining a second system to inform of the received data using a system assignment table. The system assignment table includes a source system identifier, a target system identifier, a first field, and a first field value. The method further includes informing the second system of the received data when the first field value matches a value associated with the first field of the received data.

This Abstract is provided for the sole purpose of complying with the Abstract requirement rules. This Abstract is submitted with the explicit understanding that it will not be used to interpret or to limit the scope or the meaning of the claims.

18 Claims, 9 Drawing Sheets

SYSTEM INTEGRATION ARCHITECTURE

FIELD OF THE INVENTION

The present invention relates generally to computer-based methods and systems, for establishing communication between systems utilizing an in-memory database.

BACKGROUND

Business applications may be implemented by multiple systems. For example, systems may work together on several business processes which have to use functionality of more than one system. These various systems may communicate with one another using middleware technology. However, middleware technology often performs computationally expensive tasks (e.g., XML transformations). In addition, the data related to the business objects may be stored redundantly by the various systems. As a result, efficient inter-system communication becomes a difficult task. Thus, a need exists for a system integration architecture that allows for more efficient communication between systems.

SUMMARY

In an exemplary embodiment, a inter-system communications method includes receiving data from a first system. The method further includes storing the received data in an in-memory database. The method further includes determining a second system to inform of the received data using a system assignment table. The system assignment table includes a source system identifier, a target system identifier, a first field, and a first field value. The method further includes informing the second system of the received data when the first field value matches a value associated with the first field of the received data.

In another exemplary embodiment, a system for inter-system communications comprises an in-memory database management system. The in-memory database management system including an in-memory database configured to store data common to one or more systems, and a first communication module configured to allow the one or more systems to query data from the in-memory database and to send data to the in-memory database. The in-memory database is configured to store a system assignment table. The system assignment table containing rules for triggering events upon data arrival. The system for inter-system communications further comprises a user interface module configured to allow a user to update the system assignment table. The system for inter-system communications further comprises an event management module configured to determine a system to inform of received data using the system assignment table, and to trigger an event to inform the determined system of data arrival. The system for inter-system communications further comprises a second communication module configured to inform the determined system of the received data.

In another exemplary embodiment, a non-transitory computer-readable storage medium comprises a set of processor executable instructions that when executed by a processor configure a computing apparatus to receive data from a first system, store the received data in an in-memory database, determine a second system to inform of the received data using a system assignment table. The system assignment table includes a source system identifier, a target system identifier, a first field, and a first field value. The second system is informed of data arrival when the first field value matches a value associated with the first field of the received data.

BRIEF DESCRIPTION OF THE DRAWINGS

Various embodiments taught herein are illustrated by way of example, and not by way of limitation, in the figures of the accompanying drawings, in which.

It will be recognized that some or all of the figures are schematic representations for purposes of illustration and do not necessarily depict the actual relative sizes or locations of the elements shown. The figures are provided for the purpose of illustrating one or more embodiments of the invention with the explicit understanding that they will not be used to limit the scope or the meaning of the claims.

DETAILED DESCRIPTION OF THE PREFERRED EMBODIMENTS

Before turning to the figures which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Figure 1:
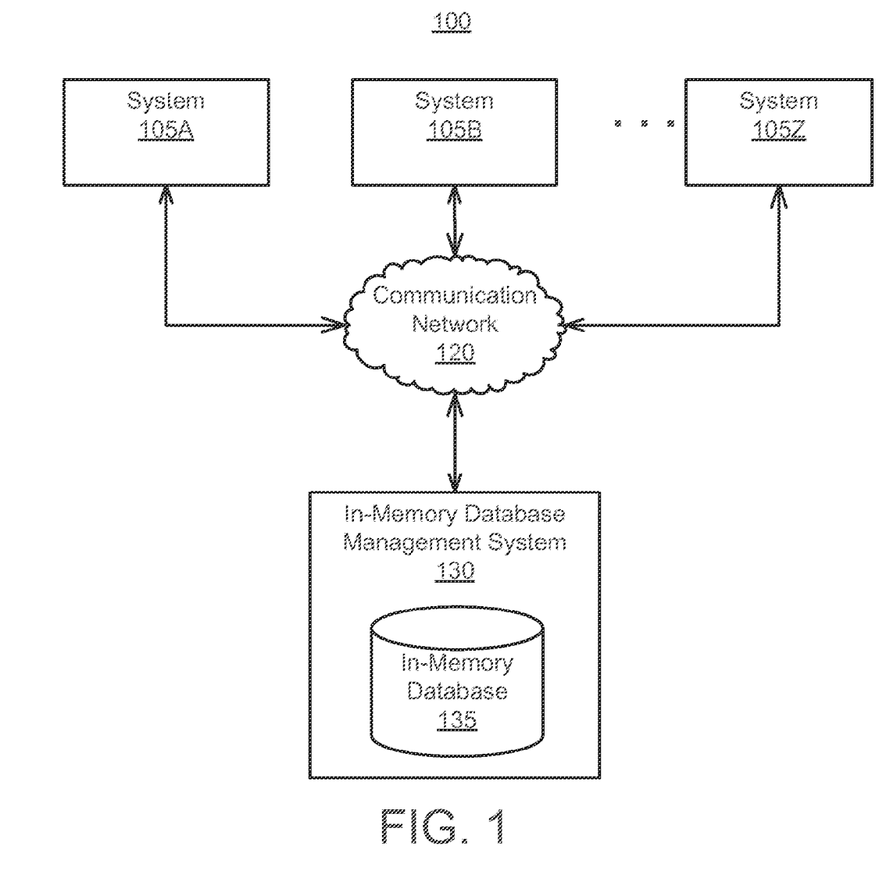
FIG. 1 is a block diagram illustrating an exemplary system integration architecture, according to one exemplary embodiment.

FIG. 1 illustrates an exemplary system integration architecture 100. The system integration architecture 100 includes systems 105A, 105B through 105Z, a communication network 120 (e.g., internet protocol (IP) network, a local area network (LAN), internet, etc.), and an in-memory database management system 130.

The in-memory database management system 130 includes an in-memory database 135. The in-memory database management system 130 may be the central platform for system integration. In some embodiments, the systems 105A, 105B through 105Z are heterogeneous systems (e.g., systems from different software manufacturers, systems having different protocols, systems with different data formats, different legacy systems, etc.). In some embodiments, the in-memory database management system 130 may link together heterogeneous systems 105A, 105B, through 105Z across a heterogeneous network environment (i.e., having different operating systems and/or protocols). The heterogeneous systems 105A, 105B through 105Z may operate on common data sets. In order to avoid redundant storage of common data sets in the systems 105A, 105B through 105Z, the producing systems (i.e., the systems that generate data and send it to the in-memory database 135) may store their data directly in the in-memory database 135. For example, one or more of the systems 105A, 105B through 105Z may transmit data to the in-memory database management system 130, which, in turn, stores the data in the in-memory database 135. As a result, any other system may access the data stored in the in-memory database 135. Accordingly, common data used by the systems 105A, 105B through 105Z is collected and stored in the in-memory database 135.

In some embodiments, the consuming systems (i.e., the systems that need to access data stored in the in-memory database 135) may need the ability to understand the data format of the producing systems. In other embodiments, the in-memory database management system 130 includes mapping information (e.g., mapping views 335 in FIG. 3) of various data formats used by the participating systems. When the data arrives in the in-memory database management system 130, one or more of the systems 105A, 105B through 105Z may be informed of the arrival of the data. As a result, the individual systems 105A, 105B through 105Z are not required to store common data redundantly, but instead access the data stored in the in-memory database 135 on demand.

Although FIG. 1 illustrates a single in-memory database management system 130 and systems 105A, 105B through 105Z, the system integration architecture 100 can include any number of in-memory databases that store data used by any number of systems. Each of the in-memory database management systems may be used by a group of systems that share certain common data. In some embodiments, there may be overlap in the systems using the in-memory database management systems. In some embodiments, one in-memory database may be used for every location (e.g., subsidiaries) that stores data frequently used in a specific region. For example, accounting data may be stored in a location having company headquarters, while customer master data may reside in a location having a customer call center.

In some embodiments, the system integration architecture 100 may be used in a cloud based context. For example, the system integration architecture 100 could be used to integrate processes over company borders. In one example, a parent company may use one in-memory database while a subsidiary company may utilize another in-memory database. In this example, the two in-memory databases may communicate with each other and access data from one another in real-time or near real-time.

The systems 105A, 105B through 105Z can fulfill different business requirements. Each of the systems 105A, 105B through 105Z may specialize in one or more particular tasks (e.g., production planning, warehouse management, customer relation management, etc.). Two or more of the systems 105A, 105B through 105Z may work together on several business processes. The systems 105A, 105B through 105Z may be operating based on common data sets. In some embodiments, the systems that produce data may store the common data sets directly in the in-memory database management system 130, and therefore advantageously enable any other involved system to access the data in real-time (or in near real-time) or on demand.

In some embodiments, the consuming systems (i.e., systems that retrieve data from the in-memory database 135) need the ability to understand the data format of the producing applications. In other embodiments, the systems may use the data format used by pre-existing middleware technology that previously inter-connected the various systems. In some embodiments, the systems 105A, 105B through 105Z may store non-redundant data in local data storage. For example, the systems 105A, 105B through 105Z may store key information in local storage that refers to the data in the in-memory database 135. Although not illustrated, the system integration architecture 100 may include third party systems or legacy systems which may store data that is of interest to the systems 105A, 105B through 105Z.

In some embodiments, each of the systems 105A, 105B through 105Z may include one or more services (e.g., web services, Windows services, Unix services, and/or any other type of service) or applications. For example, one or more of the systems 105A, 105B through 105Z may be implemented as 32 bit or 64 bit applications.

Although FIG. 1 illustrates a single communication network 120, the system can include a plurality of communication networks and/or the plurality of communication networks can be configured in a plurality of ways (e.g., a plurality of interconnected local area networks (LAN), a plurality of interconnected wide area networks (WAN), a plurality of interconnected LANs and/or WANs, etc.).

Figure 2:
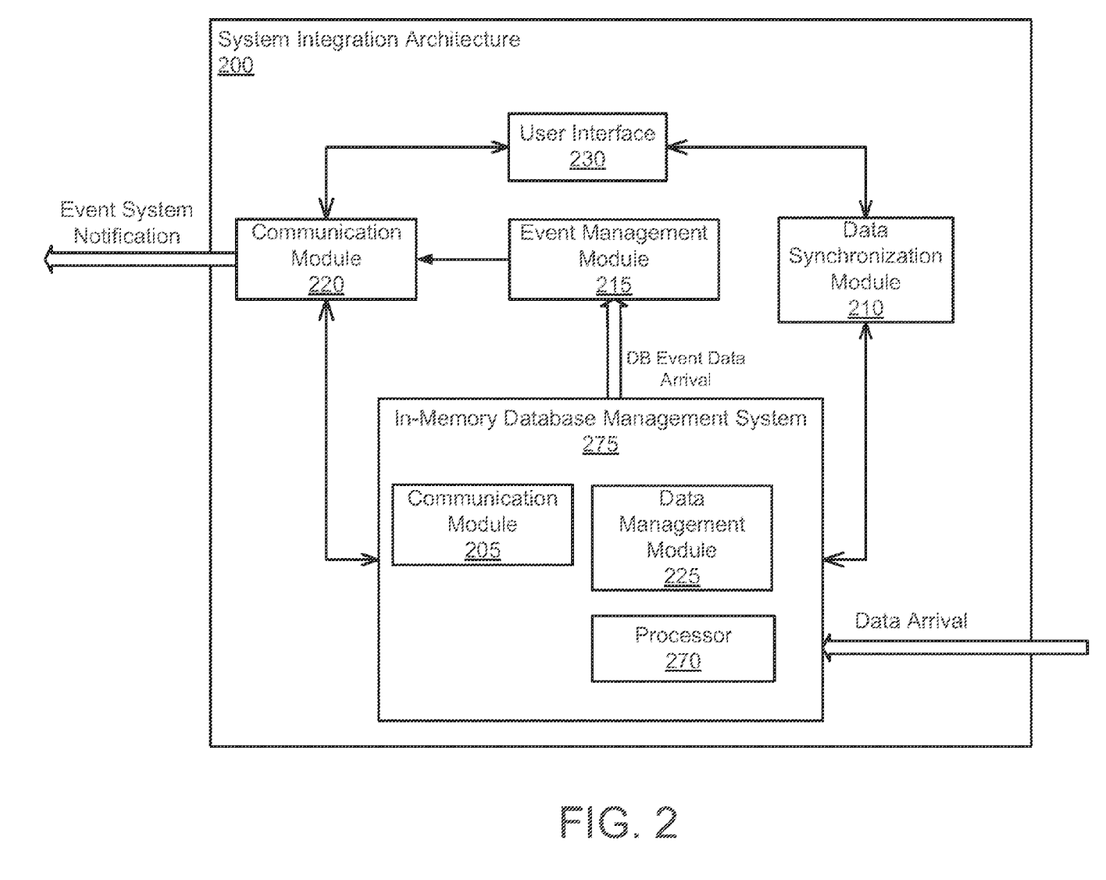
FIG. 2 is a block diagram illustrating an exemplary in-memory database management system, according to one exemplary embodiment.

FIG. 2 illustrates an exemplary system integration architecture 200. The system integration architecture 200 includes a data synchronization module 210, an event management module 215, a communication module 220, a user interface module 230, and an in-memory database management system 275. The in-memory database management system 275 includes a communication module 205, a data management module 225, a processor 270, and an in-memory database.

Figure 3:
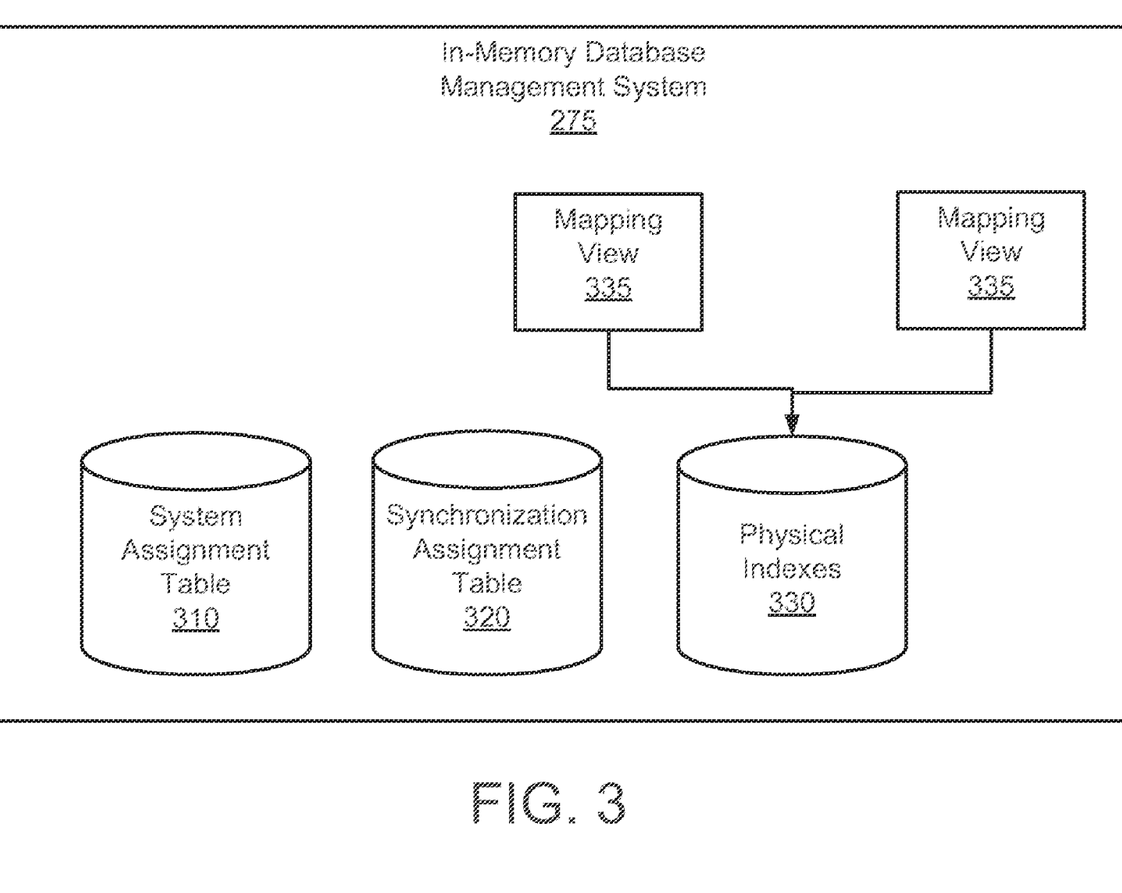
FIG. 3 is a block diagram illustrating an exemplary in-memory database management system, according to one exemplary embodiment.

The communication module 220 may send events (e.g., high level events) to systems accessing data stored in the in-memory database 275. The event management module 215 may trigger and/or manage events when new data arrives in the in-memory database 275. The communication module 205 may inform the event management module 215 about the arrival of new data. In some embodiments, the event management module 215 may turn on or turn off the events mechanism. Using a system assignment table 310 stored in the in-memory database management system 275, the communication module 220 may react on the events triggered by the event management module 215 by informing one or more target systems of new data arrival. In some embodiments, the communication module 220 may send a notification to a target system informing the target of the arrival of the data. In these embodiments, the notification may contain information regarding the arrived data including identification of a source system that sent the data to the in-memory database, identification of an index storing the data (e.g., index id), and/or key information associated with the data (e.g., order id), etc.

The data synchronization module 210 synchronizes the data stored in the in-memory database 275. The data synchronization module 210 may communicate with the in-memory database management system 275 to read the stored physical indexes 330. The data synchronization module 210 may react on the events triggered by the event management module 215 when data arrives in the in-memory database 275 in order to trigger synchronization flows. In some embodiments, the producing systems (i.e., systems sending data for storage to the in-memory database 275) may ensure the consistency of its data stored in the in-memory database.

The user interface module 220 manages user interfaces for updating data related to event triggering and routing logic, and/or data related to data synchronization. The user interface module 220 may manage one or more user interfaces allowing the user to maintain the system assignment table 310 stored in the in-memory database 275. A user interface may allow a user to add or update various fields stored in the system assignment table 310 (e.g., source system, target system, value of the index field, and/or any other column). For example, when a new system is added to the system integration architecture 100, the user interface may enable a user to add the system and determine how the data generated by the new system should be routed through the system landscape. The user interface module 220 may provide one or more interfaces for managing a synchronization assignment table 320 and/or the physical indexes 330. The interfaces for managing the synchronization assignment table 320 may enable a user to create mappings between non-matching fields of various systems.

The in-memory database management system 275 may be a central repository of data used by various systems (e.g., systems 105A, system 105B through system 105Z). In some embodiments, the in-memory database management system 275 is advantageously stored in volatile storage, volatile memory, or other form of temporary storage for fast data access. For example, the in-memory database of the in-memory database management system 275 may be stored in random access memory (e.g., dynamic random access memory, static random access memory).

When a server holding the in-memory database 275 powers off (e.g., due to a reboot, shut down, power outage, etc.), the data stored in the in-memory database may be lost. In some embodiments, to avoid loss of data due to server powering off, the data management module 225 may periodically back up the data stored in the in-memory database into persistent data storage (e.g., disk). In other embodiments, when the server holding the in-memory database 275 comes back on, the data management module may restore all or part of the data that was stored in the in-memory database 275 (e.g., from back up stored on disk, from requesting data from other systems, etc.).

The amount of data that the in-memory database 275 may store in volatile memory depends in part on the amount of volatile or main memory available on a server storing the in-memory database 275. For example, a server running a 32 bit operating system may be limited to 4 GB of volatile memory, while a server running a 64 bit operating system is technically unlimited (e.g., 16 exabytes of memory).

In some embodiments, the in-memory database management system 275 may store data regarding events triggered based upon data arrival. The in-memory database management system 275 may store information regarding synchronization flows. In some embodiments, the data stored by the in-memory database 275 is not stored by the systems transmitting and/or accessing the data. In other embodiments, the systems accessing the in-memory database 275 may store primary key information in order to access the data stored in the in-memory database.

The processor 270 executes the operating system and/or any other computer executable instructions for the in-memory database (e.g., executes applications, etc.). The random access memory can temporarily store the operating system, the instructions, and/or any other data associated with the in-memory database management system 275. The random access memory can include one or more levels of memory storage (e.g., processor register, storage disk cache, main memory, etc.).

The modules and/or devices can be hardware and/or software. The modules and/or devices in the system integration architecture 200 can, for example, utilize the processor 270 to execute computer executable instructions and/or include a processor to execute computer executable instructions (e.g., an encryption processing unit, a field programmable gate array processing unit, etc.). It should be understood that the system integration architecture 200 can include, for example, other modules, devices, and/or processors known in the art and/or varieties of the illustrated modules, devices, and/or processors. It should be understood that the modules and/or devices illustrated in the system integration architecture 200 can be located within the system integration architecture 200 and/or connected to the system integration architecture 200 (e.g., directly, indirectly, etc.), but outside of the physical components of the system integration architecture 200.

As illustrated in FIG. 3, the in-memory database management system 275 may include a system assignment table 310, a synchronization assignment table 320, and physical indexes 330. In some embodiments, the system assignment table 310 is stored in an index in the in-memory database management system 275. The system assignment table 310 may be the basis for flow of events when new data arrives in the in-memory database management system 275. In other words, the system assignment table 310 contains logic determining which systems need to be informed of the data arrival. In some embodiments, the system assignment index 310 contains data regarding the status of the data (e.g., state of the offer or order, etc.). For example, system B may be interested in "new" orders, while system D may be interested in "invoiced" orders. The system assignment table 310 may store any combination of data values used to trigger events.

In some embodiments, the synchronization assignment table 320 may store information about tables that have to be kept in sync with other in-memory tables (e.g., local in-memory database for different subsidiaries). Applications may access data transparently without having to know from where the data was initially uploaded. The synchronization assignment table 320 may store information regarding synchronization of data. An exemplary synchronization assignment table 320 may store data regarding a source in-memory database, a destination in-memory database, tables, synchronization conditions, etc. For example, two systems may access and/or store data in the in-memory database but use different data structures. The synchronization assignment table 320 may contain the necessary mappings of the two data structures so that different views of the same data may be created. For example, the synchronization assignment table 320 may contain data that the "surname" field in system A (e.g., Outlook) corresponds to the "last name" field in system B (e.g., Lotus).

In some embodiments, the physical indexes 330 store the data produced and accessed by the various systems, including the meta data and transactional data. In these embodiments, the physical indexes 330 store data in indexes instead of in tables as in traditional databases. For example, each index may store data related to one type of business object (e.g., one index in the physical index 330 may store data related to orders). In other examples, a single index may contain data regarding multiple business objects. In some embodiments, the in-memory database may store common data that is relevant for the systems accessing the in-memory database. In other embodiments, the data stored in the in-memory database may also be stored in the producing systems for the sake of failover. In some embodiments, the systems may store small indexes which hold a matching projection on the index view stored in the in-memory database management system 275.

As illustrated in FIG. 3, mapping views 335 may be defined on an index, which include fields with different names or concatenate fields to new names, such that systems do not have to perform conversions of fields (e.g., from Outlook to Lotus Notes). In some embodiments, the mapping views may be created with a SQL sequence (e.g., "create view as (sql select)". In some embodiments, the mapping views may be created with a table with destination field or source formula (e.g., "field a & field b).

Figure 4A:
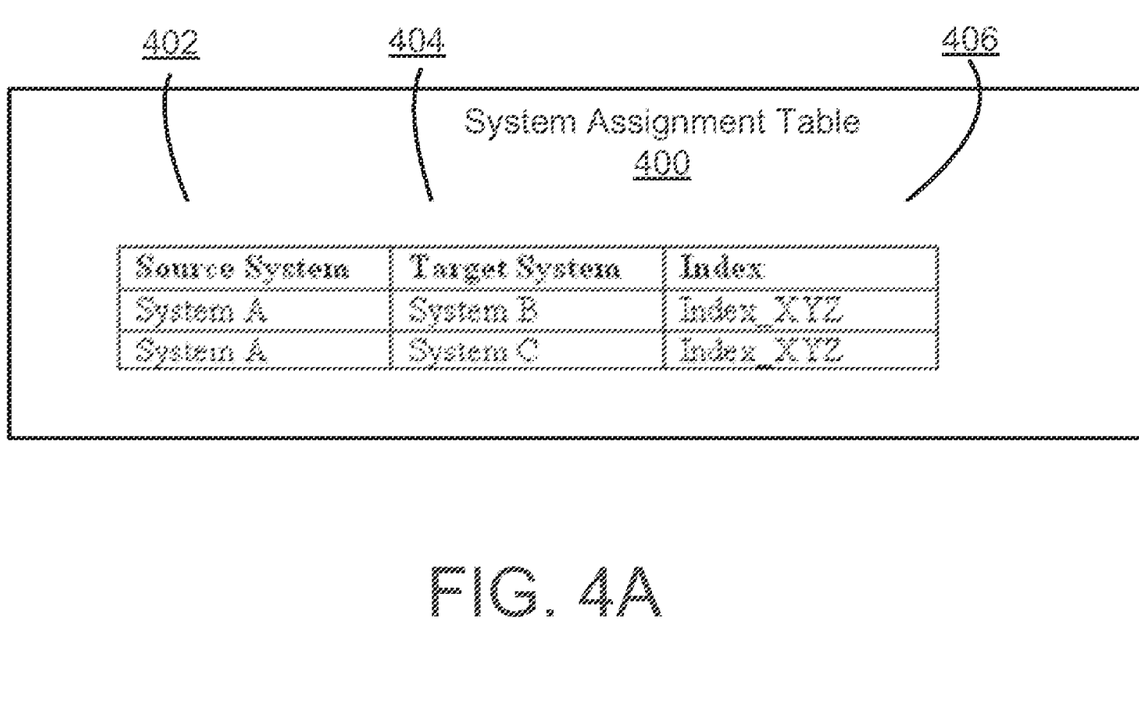
FIGS. 4A-4D illustrate exemplary flow of data between exemplary systems using exemplary system assignment tables, according to one exemplary embodiment.

FIG. 4A illustrates an exemplary system assignment table 400. The system assignment table 400 is shown to include information regarding a source system 402, a target system 404, and an index 406. The source system 405 is a system that sends data to the in-memory database 275 for storage. The target system 404 indicates a system that may be interested in the arrival of the data received from the source system 402. The index 406 contains information regarding an index that stores the data received from the source system 402. For example, the index 406 may contain an identifier (e.g., unique id, name, etc.) of an index storing data received from system A.

Figure 4B:
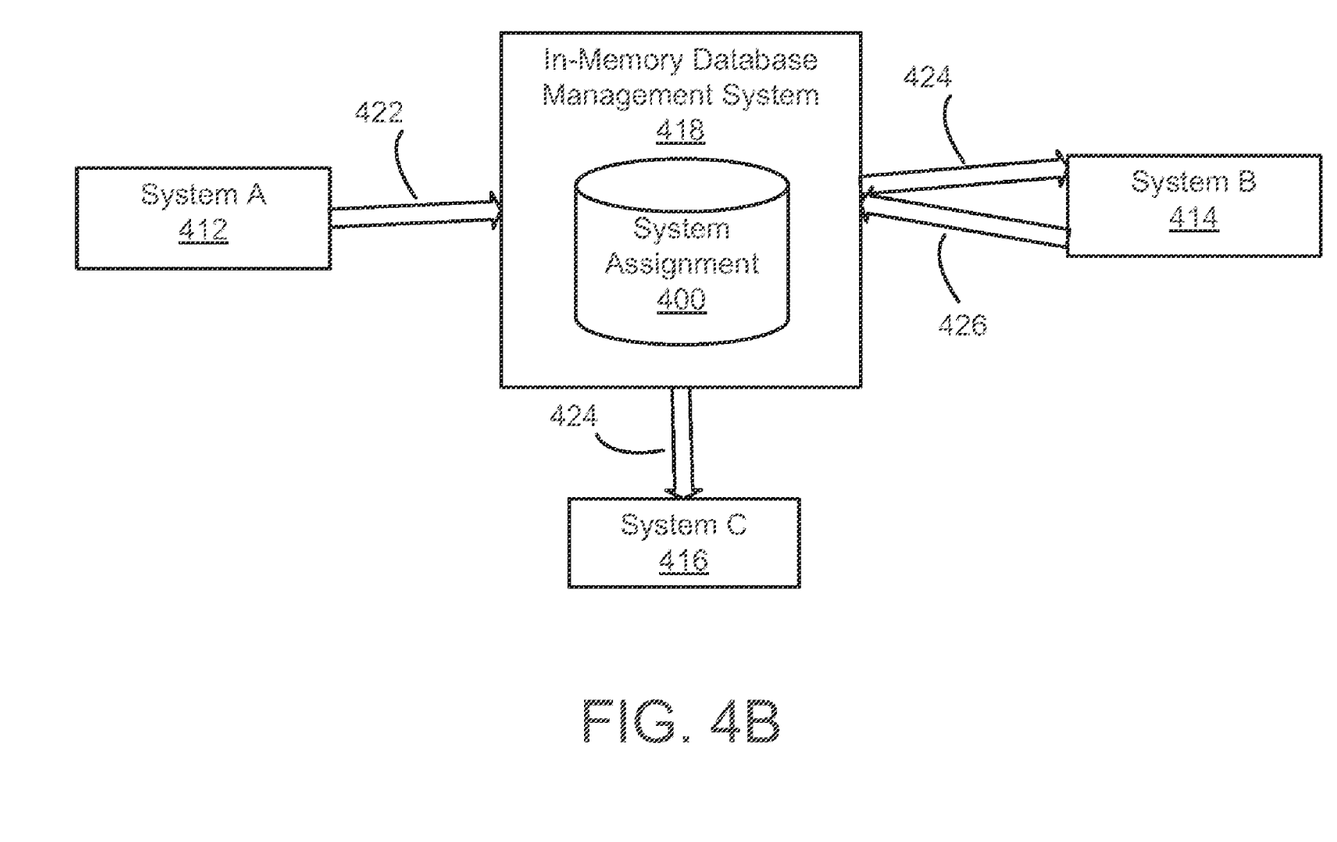

FIG. 4B illustrates an exemplary flow of data between system A 412, system B 414, system C 416, and in-memory database management system 418, using the system assignment table 400. For example, the system A 412 may be a system that produces orders and stores them in the in-memory database 275. In this example, system B 414 may be a production system that produces the products which have been ordered by a customer. Finally, system C 416 may be a calculation system that sends out invoices to the customer depending on the status of the order.

The system A 412 sends (step 422) data (e.g., order data) to the in-memory database management system 418. In some embodiments, a middleware system may send data to the in-memory database management system 418. The system assignment table 400 specifies that system B 414 and system C 416 need to be informed of data arrival from system A 412. As a result, the communication management module 205 informs (steps 424) the systems B 414 and C 416 that data has arrived from the system A 412. At steps 424, the systems B 414 and 416 are informed (e.g., via events) that new data (i.e., new orders) have arrived. In other embodiments, the middleware system may query the in-memory database management system 418 to determine whether new data has arrived.

In some embodiments, the systems B 414 and C 416 may determine whether the data that has arrived is relevant for them. For example, if an order arrives in the in-memory database 275, the status of the order might be new. In this example, status of the order may be one of the fields that are stored in the physical indexes 330. The system B 414 may know that new orders are relevant for production processes performed by the system B 414. In this case, the system B 414 would read the order data from the in-memory database 275 and execute the production based on the order data. In some embodiments, the system B 414 may update the status of the order to "produced" in the in-memory database 275. In turn, the system C 416 may only be interested in orders with a status of "produced". Accordingly, the system C 416 may determine that the status of the order is "new" and not extract data from the database. In these embodiments, the systems B 414 and C 416 contain modules that determine whether the systems are interested in accessing the data that has been received by the in-memory database management system 418. In other embodiments, the systems A 412, B 414, and C 416 are not informed of data arrivals and instead the systems may periodically (e.g., nightly basis, hourly basis, etc.) access the in-memory database management system 418 to determine whether any data of interest has arrived.

Figure 4C:
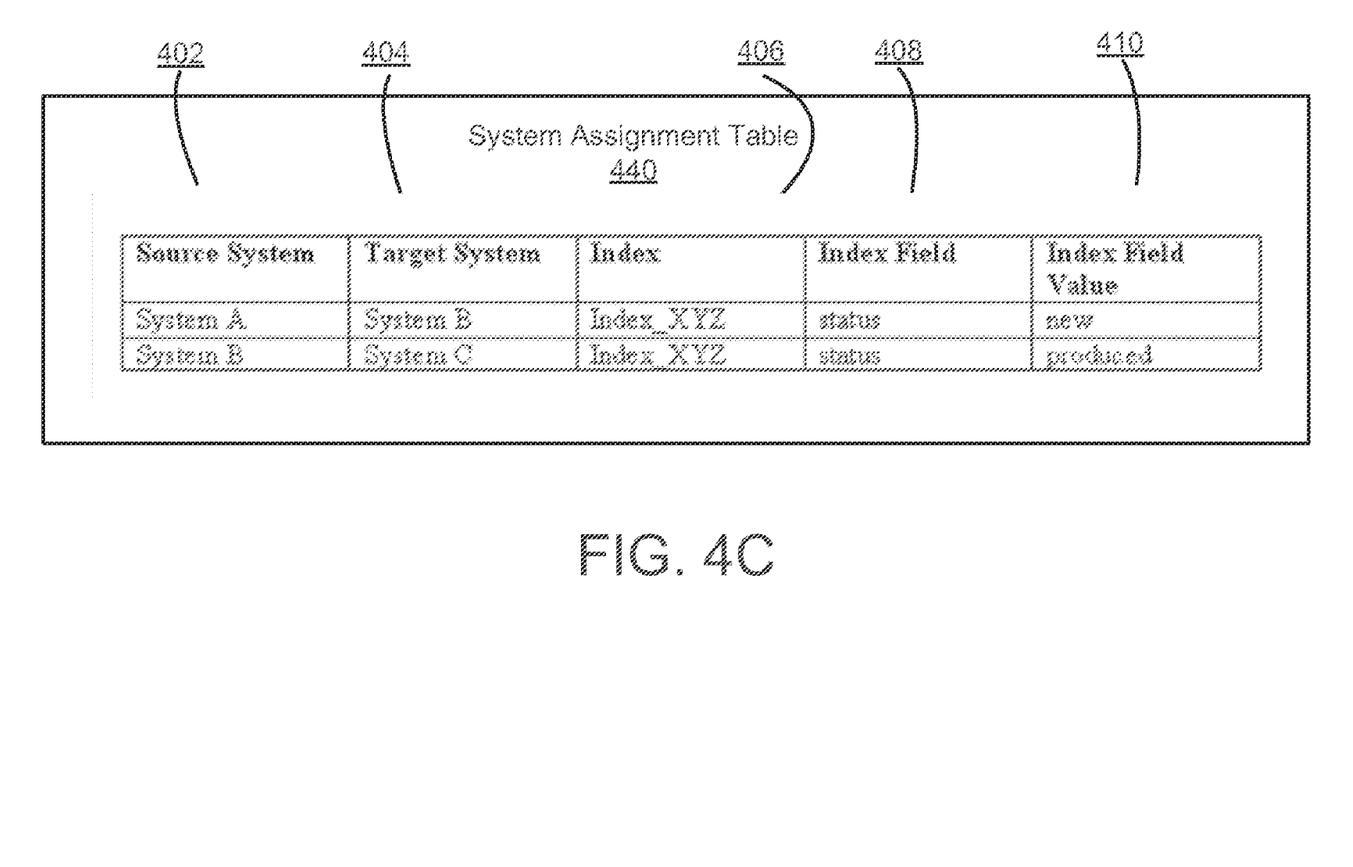

FIG. 4C illustrates another exemplary system assignment table 440 that ensures that only the right systems are informed when relevant data arrives in the in-memory database. The system assignment table 440 is shown to include information regarding the source system 402, the target system 404, the index 406, an index field 408, and an index field value 410. As discussed above, the source system 405 indicates a system that sends data to the in-memory database 275 for storage, and the target system 404 indicates a system that needs to be informed of the arrival of data from the source system 402. The index 406 contains information regarding an index that stores the data received from the source system 402 in the physical indexes 330. For example, the value of the index column may be an index identifier (e.g., index name, unique index number, etc.). The index field 408 and the index field value 410 include logic that ensures that only an interested target system 404 is informed when relevant data has arrived from the source system 402. For example, as illustrated, when data has arrived from system A, system B should be informed only when the field "status" of the index is set to "new".

Figure 4D:
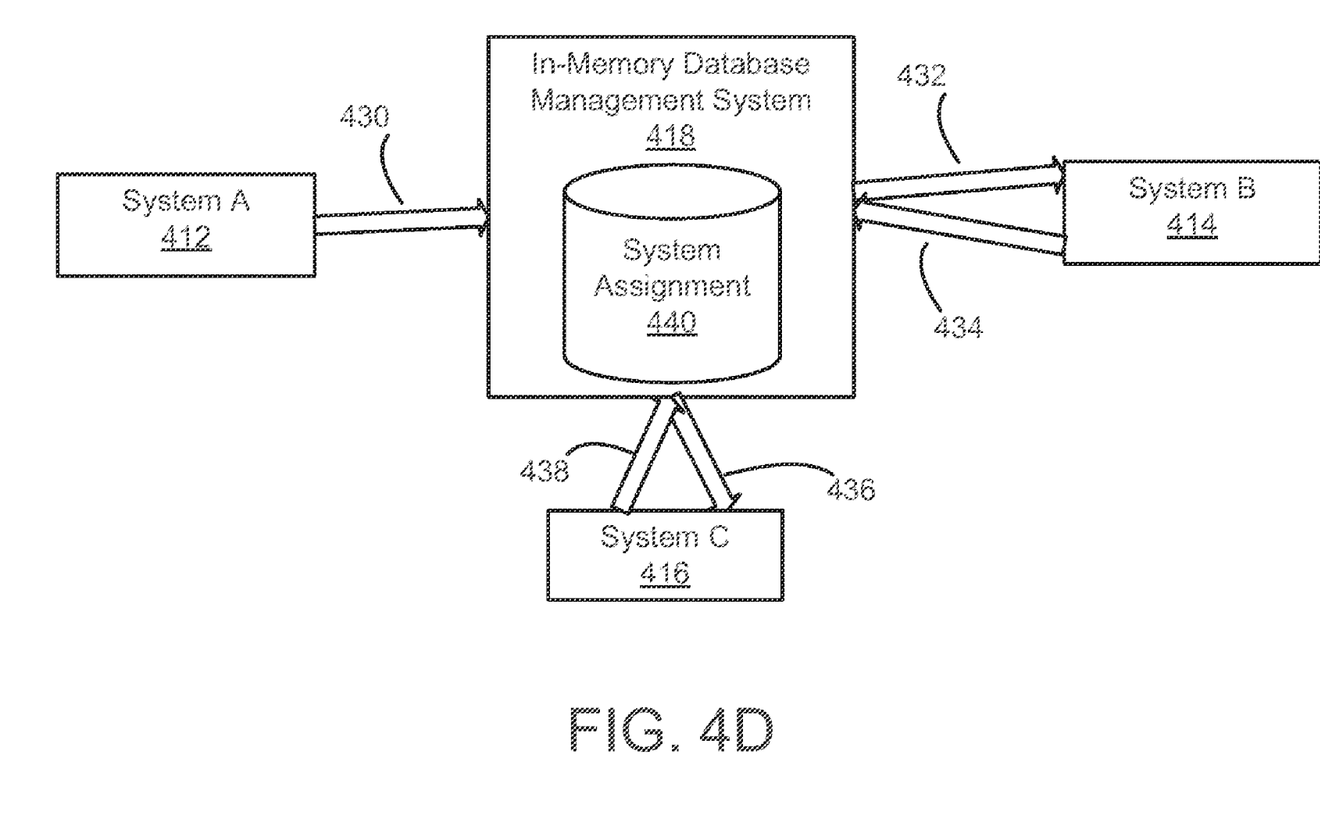

FIG. 4D illustrates an exemplary flow of data between system A 412, system B 414, system C 416, and in-memory database management system 418, using the system assignment table 440. System A 412 sends (step 430) data (e.g., order data) to the in-memory database management system 418. The system assignment table 440 specifies that the system B needs to be informed of relevant data arrival from the system A 412. As a result, the data communication module 225 informs (step 432) the system B 414 that data has arrived from the system A 412. In response to receiving notifications of data arrival, the system B 414 may retrieve the relevant data stored in the in-memory database 418 for further processing. As illustrated, at this point, the system C 416 is not informed of the data (e.g., order data) arrival because the status of the order has not changed to "produced" yet.

For example, system B 414 may use the extracted order data to execute the production of products that have been ordered. At step 434, the system B 414 may update the status of the order (e.g., to "produced"). In some embodiments, the system B 414 may transmit additional data relating to the data received from the system A 412. The system assignment table 440 indicates that when the order has a value of "produced", the system C 416 needs to be informed. Once the in-memory database management system 418 receives data from the system B 414 and the order is marked as "produced", the in-memory database management system 418 informs the system C 416. For example, the system C 416 may be informed that order and production data is available to produce an invoice. In this example, the system C 416 may produce an invoice for the order data and update the order to have the value "invoiced". Although not shown, at this point, another system may be notified that the order in question has been invoiced. In another example, the index column 406 may contain value "Index_Order", and the index field column 408 may contain value "accounting area", with the index field value column 410 having various country codes (e.g., DE, US, etc.)

Although assignment table 440 is illustrated to include an index "Index_XYZ" having a status of "new" or "produced", the values of the "status" field may contain any other values appropriate for the business objects associated with the data stored in the index. In some embodiments, the index may have one or more fields as defined by the user (e.g., using one or more user interfaces provided by the user interface module 220) or pre-defined by the data communication module 205 to further direct the flow of events upon new data arrivals to the in-memory database management system 418. In these embodiments, the values of these fields determine which target systems need to be notified of data arrival.

Figure 5:
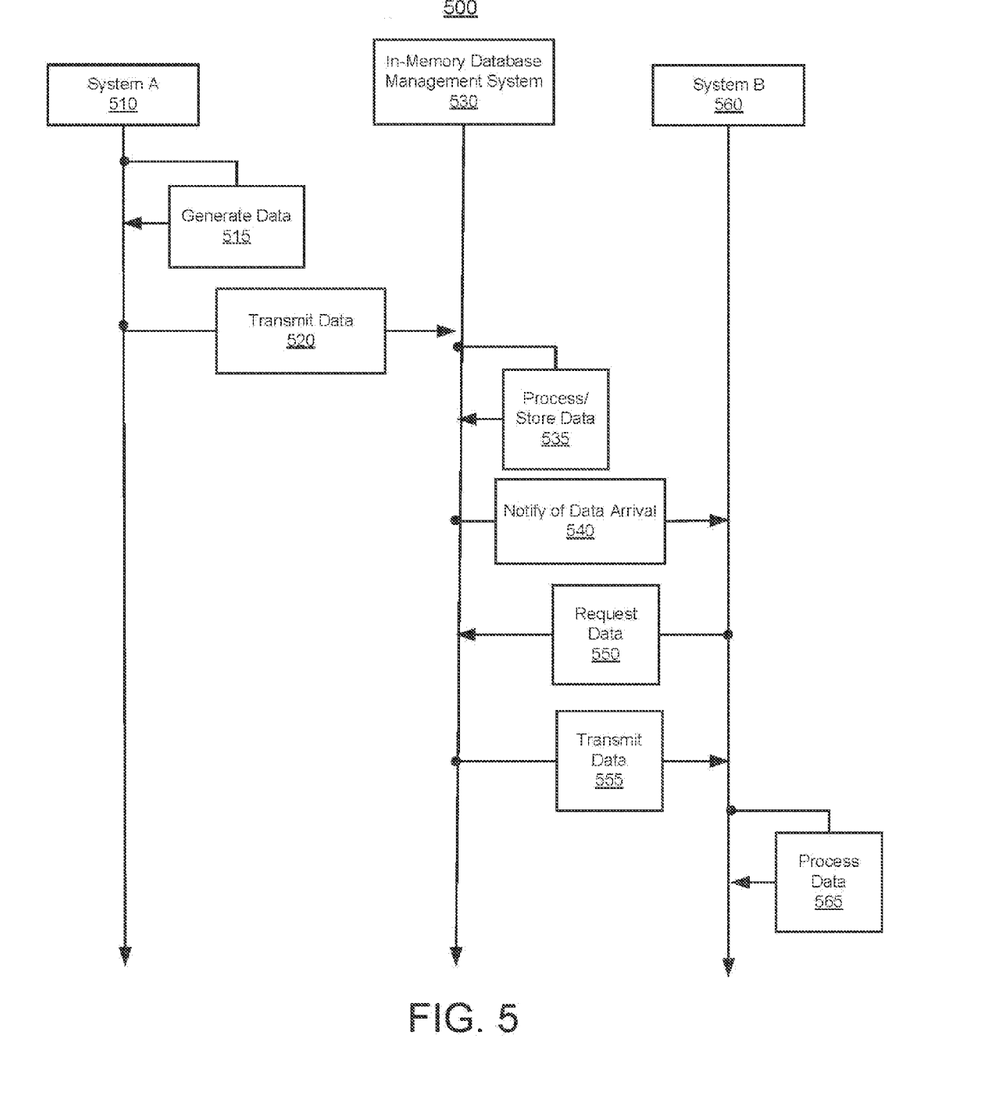
FIG. 5 illustrates a flow chart of the exemplary flow of data between exemplary services.

In FIG. 5, a flow chart 500 relating to transfer of data between a system A 510, a system B 560, and an in-memory database management system 530 is shown, according to an exemplary embodiment. The system A 510 generates (step 515) data (e.g., order data). In some embodiments, the system A 510 receives the data of interest from another system or data storage. At step 520, using the data communication module 205, the system A 510 transmits (step 520) the data to the in-memory database management system 530 for storage. For example, the system A 510 may send data to the in-memory database using SQL.

In some embodiments, the data management module 225 may process the received data (e.g., cleanse the data, transform the data, etc.). As discussed further with respect to FIG. 6, the event management module 215 may determine what target systems to notify of the arrival of the received data. As illustrated in FIG. 5, the communication module 225 notifies (step 540) the system B 560 of the data arrival. In some embodiments, the communication module 225 may notify all the connected systems. In other embodiments, the system B 560 may have a data management module configured to determine whether the data received by the in-memory database management system 530 is of interest to the system B 560. In other embodiments, using the system assignment table 310, the event management module 215 may determine what systems would be interested in the received data.

At step 550, the system B 560 requests (step 550) data from the in-memory database management system 530. In response, the communication module 205 transmits (step 555) data from the in-memory database management system 530 to the system B 560, which in turn may further process (step 565) or use the received data. For example, the system B 560 may execute production of the ordered products based on the received order data. In some embodiments, the in-memory database management system 530 may be used for real-time or near real-time communication between systems A 510 and B 560. In these embodiments, common data sets used by the systems A 510 and B 560 are stored in the in-memory database 530 instead of redundantly storing them in the systems A 510 and B 560 individually. As a result, the systems A 510 and B 560 and any other systems may access the common data sets on demand and in real-time basis.

Figure 6:
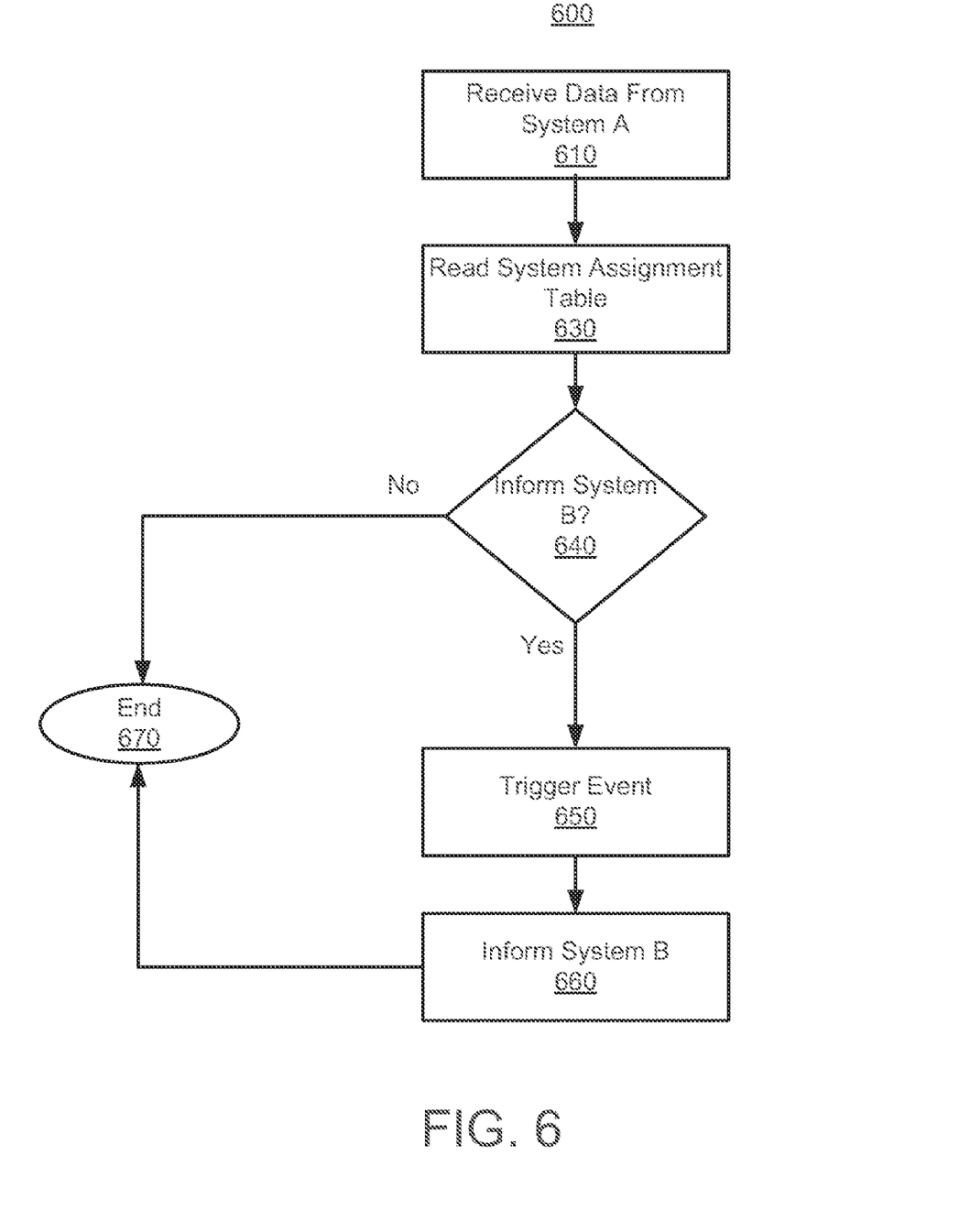
FIG. 6 illustrates a flow chart showing data processing by an exemplary in-memory database management system.

In FIG. 6, a flow chart 600 relating to the in-memory database management system 275 informing interested systems of data arrival is illustrated, according an exemplary embodiment. At step 610, the communication module 205 receives data from a system A. At step 620, the event management module 215 reads data from the system assignment table 310. As illustrated in FIG. 4C, the system assignment table may contain information including target systems interested in information received from the system A. Based on the information retrieved from the system assignment table 310, the event management module 215 may determine (step 640) which systems should be informed about the data arrival. For example, if the received data includes data for "new" orders, then the event management module 215 may trigger (step 650) an event for the communication module 205 to inform (steps 660) the system B of the arrival of "new" orders from the system A. In some embodiments, the event management module 215 may raise an event to inform the system B that data has arrived. In some embodiments, the system B may read the arrived data from the in-memory database 275 and perform further processing based on the extracted data.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above-described techniques can be implemented on a computer having a display device. The display device can, for example, be a cathode ray tube (CRT) and/or a liquid crystal display (LCD) monitor. The interaction with a user can, for example, be a display of information to the user via a keyboard or a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The client device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various non-transitory computer readable storage media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, various functions described herein can be implemented in hardware, software, firmware, or any combination thereof. If implemented in software, the functions can be stored on or transmitted over as one or more instructions or code on a non-transitory computer-readable storage medium. Non-transitory computer-readable storage media can be non-transitory in nature and can include both computer storage media and communication media including any medium that facilitates transfer of a computer program from one place to another. A storage media can be any available media that can be accessed by a computer. By way of example, and not limitation, such non-transitory computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any physical connection is properly termed a non-transitory computer-readable storage medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of non-transitory computer-readable storage media.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What claimed is:

1. A method for inter-system communications between diverse participating systems having different data formats, the method comprising:

receiving data from a first system;

storing the received data in physical indexes in an in-memory database, wherein each physical index is associated with data related to a respective one or more types of business objects and wherein the each physical index is linked to a mapping view having mapping information of various data formats used by the diverse participating systems for the respective one or more types of business objects;

determining a second system to inform of the received data using a system assignment table, wherein the first system and second system are designated as a source system and a target system, respectively, wherein the system assignment table includes a source system identifier, a target system identifier, an index identifier, an index field, and an index field value; and informing the second system of the received data only when the index identifier has a particular value and when the index field value matches a value-associated with an index field of the received data.

2. The method of claim 1, wherein the informing step includes triggering an event to inform the second system.

3. The method of claim 1, further comprising receiving a request from the second system for the received data.

4. The method of claim 3, further comprising transmitting the requested data to the second system.

5. The method of claim 4, wherein the data received from the first system is in a first data format and the data transmitted to the second system is in a second data format, the first format being different from the second format.

6. The method of claim 1, wherein the data received from the first system and the data transmitted to the second system have the same format.

7. The method of claim 6, further comprising mapping the received data to the second data format using a synchronization table.

8. The method of claim 1, wherein the in-memory database is stored in volatile memory.

9. The method of claim 1, wherein the in-memory database stores the system assignment table.

10. A system for inter-system communications amongst diverse participating computer systems having different data formats, the system for inter-system communications comprising:
   a processor coupled to a memory;
   an in-memory database management system including an in-memory database configured to store data common to one or more of the diverse participating computer systems in physical indexes,
   wherein each physical index is associated with data related to a respective one or more types of business objects and wherein the each physical index is linked to a mapping view having mapping information of various data formats used by the diverse participating systems for the respective one or more types of business objects;
   a first communication module configured to allow the one or more of the diverse participating computer systems to query data from the in-memory database and to send data to the in-memory database,
   wherein the in-memory database stores a system assignment table, the system assignment table containing rules for triggering events upon arrival of data sent by a first of the diverse participating computer systems;
   an event management module configured to determine a second of the diverse participating computer systems to inform of received data using the system assignment table, and trigger an event to inform the second of the diverse participating computer systems of data arrival; and
   a second communication module configured to inform the second of the diverse participating computer systems of the received data in response to the event triggered by the event management module; and
   a user interface module configured to allow a user to update the system assignment table,
   wherein the system assignment table includes a source system identifier, a target system identifier, an index identifier, an index field, and an index field value for the received data, and
   wherein the second of the diverse participating computer systems is informed of data arrival when the index field value matches a value associated with the index field of the received data.

11. The system of claim 10 further comprising a data synchronization module configured to synchronize data stored in the in-memory database.

12. The system of claim 10 wherein the first communication module further configured to receive a request for the received data, and to transmit the requested data to the second system.

13. The system of claim 12, wherein the received data is in a first data format and the data transmitted to the second of the diverse participating computer systems is in a second data format, the first format being different from the second format.

14. The system of claim 11, wherein the data synchronization module is further configured to map the received data to the second data format using a synchronization table.

15. The system of claim 10 wherein the in-memory database is stored in volatile memory.

16. A non-transitory computer-readable storage medium, the non-transitory computer-readable storage medium comprising a set of processor executable instructions that when executed by a processor configure a computing apparatus to:
   receive data from a first system in communications between diverse participating systems having different data formats;
   store the received data in physical indexes in an in-memory database, wherein each physical index is associated with data related to a respective one or more types of business objects and wherein the each physical index is linked to a mapping view having mapping information of various data formats used by the diverse participating systems for the respective one or more types of business objects;
   determine a second system to inform of the received data using a system assignment table,
   wherein the system assignment table includes a source system identifier, a target system identifier, an index identifier, an index field, and an index field value; and
   inform the second system of the received data only when the index identifier has a particular value and when the index field value matches a value-associated with an index field of the received data.

17. The non-transitory computer-readable storage medium of claim 16,
   wherein the in-memory database is stored in volatile memory.

18. The non-transitory computer-readable storage medium of claim 16,
   wherein the computing apparatus further configured to receive a request for the received data, and transmit the requested data to the second system.

* * * * *